(12) United States Patent
Fujita et al.

(10) Patent No.: US 7,281,113 B2
(45) Date of Patent: Oct. 9, 2007

(54) MICROCOMPUTER WITH BUILT-IN ELECTRICALLY REWRITABLE NONVOLATILE MEMORY

(75) Inventors: Mitsutoshi Fujita, Osaka (JP); Kenji Tsutsumi, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 276 days.

(21) Appl. No.: 11/140,944

(22) Filed: Jun. 1, 2005

(65) Prior Publication Data

US 2005/0268069 A1 Dec. 1, 2005

(30) Foreign Application Priority Data

Jun. 1, 2004 (JP) ............................. 2004-163530

(51) Int. Cl.
*G06F 12/00* (2006.01)
*G06F 13/00* (2006.01)

(52) U.S. Cl. ...................... 711/202; 711/103; 711/154
(58) Field of Classification Search ................ 711/3, 711/100, 104, 105, 154, 200, 202, 103
See application file for complete search history.

(56) References Cited

U.S. PATENT DOCUMENTS

| 4,771,407 A | * | 9/1988 | Takemae et al. | ............ 365/226 |
| 6,333,880 B1 | * | 12/2001 | Mitsui | ........................ 365/201 |
| 2004/0183508 A1 | * | 9/2004 | Toyoda et al. | .............. 323/265 |

FOREIGN PATENT DOCUMENTS

JP 2002-007374 1/2002

* cited by examiner

*Primary Examiner*—Tuan V. Thai
(74) *Attorney, Agent, or Firm*—McDermott Will & Emery LLP

(57) ABSTRACT

A microcomputer comprises a CPU; a nonvolatile memory; a plurality of volatile memories; a system bus; a program transfer bus; a program transfer section; an address conversion section; and a voltage detection section. The volatile memories include a plurality of memories switchable to be used as transfer and execution memories in accordance with a program execution state by the CPU. Where the voltage detected by the voltage detection section is lower than a first voltage, the program transfer section transfers the part of the program stored in the nonvolatile memory to the transfer memory, and the address conversion section converts an address in the nonvolatile memory output from the CPU into an address in the execution memory.

14 Claims, 11 Drawing Sheets

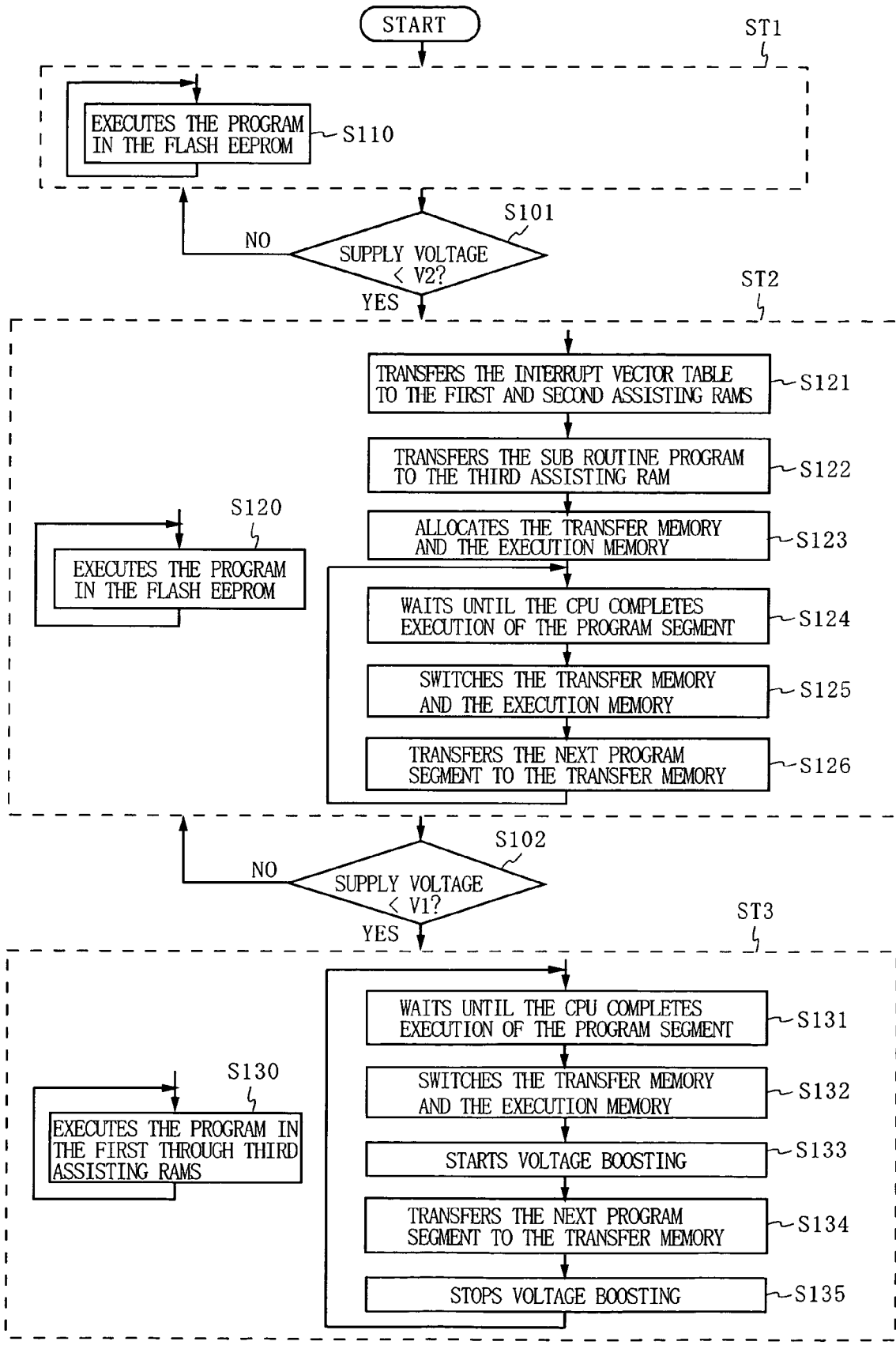

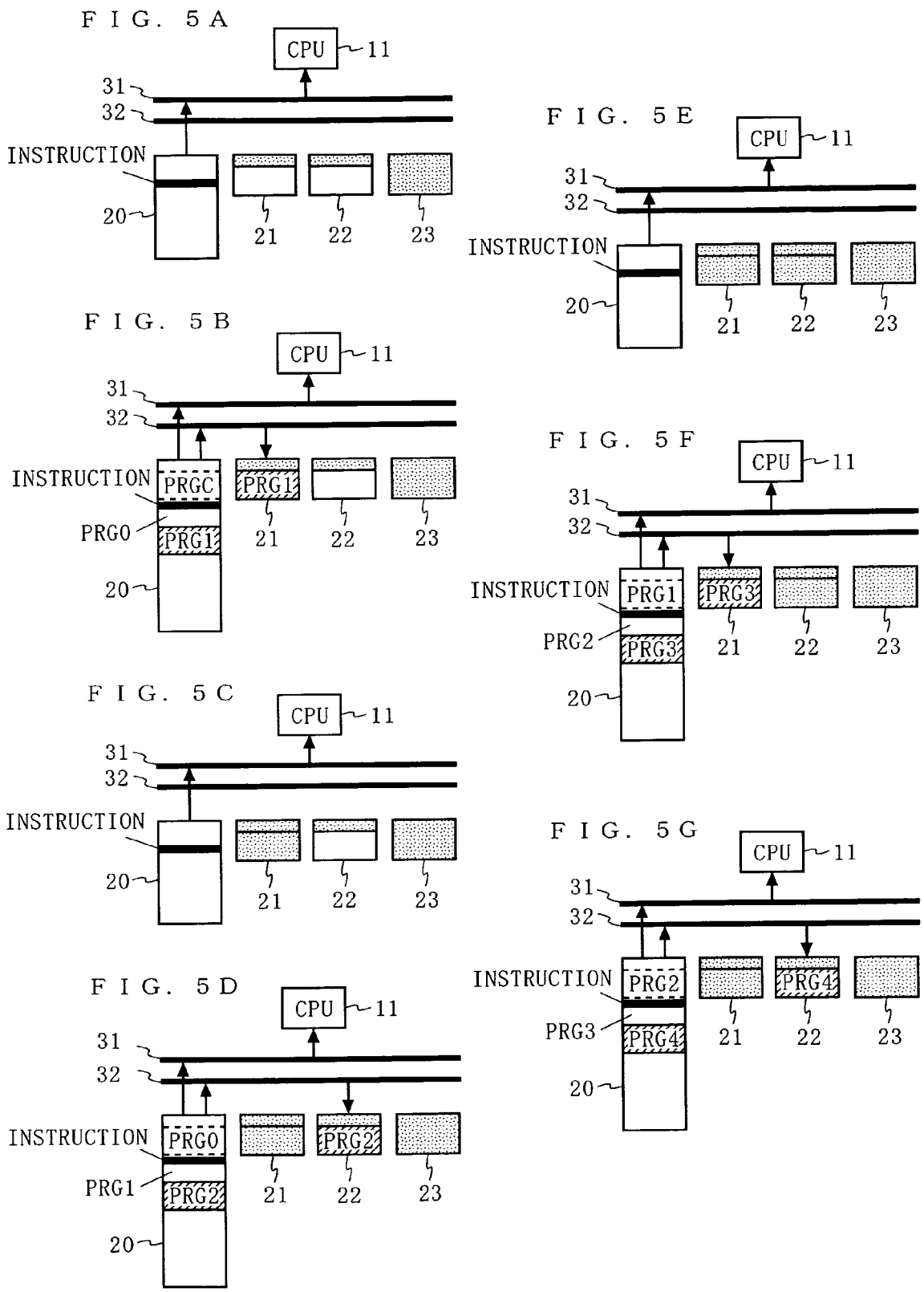

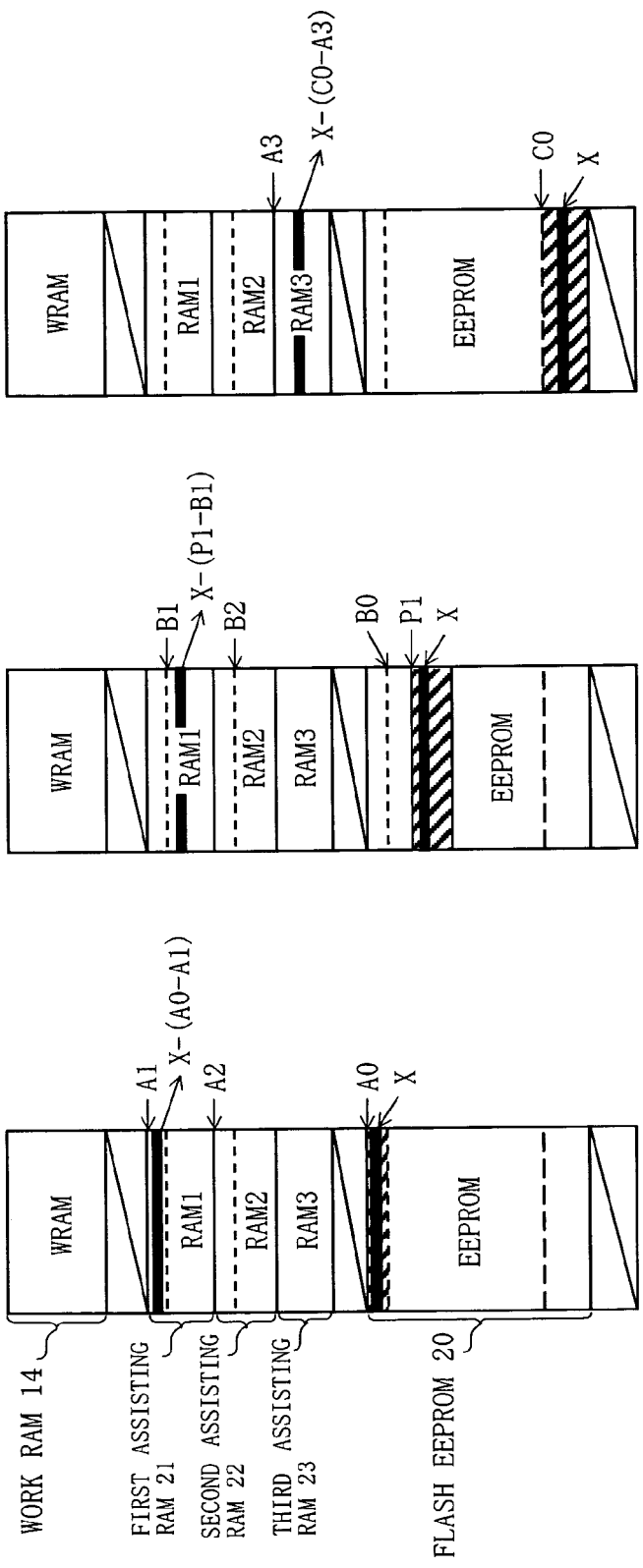

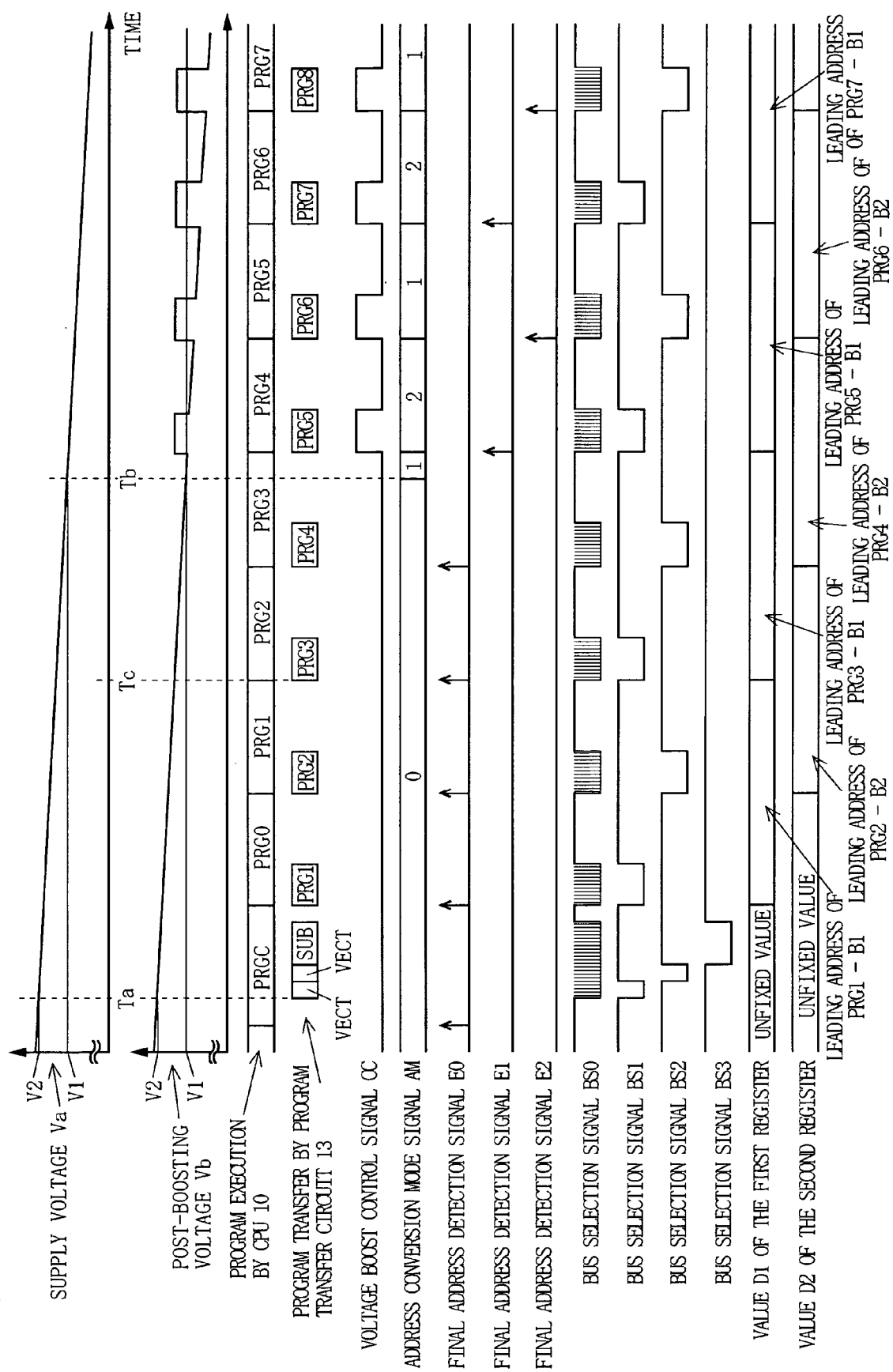

MICROCOMPUTER WITH BUILT-IN ELECTRICALLY REWRITABLE NONVOLATILE MEMORY

BACKGROUND OF THE INVENTION

1. Field of the Invention

The present invention relates to a microcomputer with a built-in electrically rewritable nonvolatile memory, and more specifically to a microcomputer operable even when the supply voltage is lower than the lower operating voltage limit of the built-in nonvolatile memory.

2. Description of the Background Art

For performing system development using incorporated microcomputers, microcomputers with a built-in flash EEPROM (Electrically Erasable Programmable Read-Only Memory), which is one type of electrically rewritable nonvolatile memory, are often used in order to facilitate program changes and to shorten the period of development. However, microcomputers with a built-in flash EEPROM are more expensive than microcomputers which do not allow programs thereinto be rewritten (for example, microcomputers with a mask ROM). For this reason, in order to shorten the period of development and also reduce the mass production cost, a microcomputer with a built-in flash EEPROM is used for program development whereas a microcomputer with a built-in mask ROM is used for mass production in some occasions. In other occasions, in order to start mass production at the earliest possible time, the production of microcomputers with a built-in mask ROM is started when program development is completed, while mass production using a microcomputer with a flash EEPROM is performed until the production of the microcomputers with a built-in mask ROM is completed.

In general, the operating voltage range of a flash EEPROM is narrower than that of a mask ROM. Therefore, system development and mass production using both a microcomputer with a built-in flash EEPROM and a microcomputer with a built-in mask ROM may cause a problem in that the two types of microcomputers perform different operations due to the different operating voltage ranges.

As a microcomputer with a built-in flash EEPROM operable even when the supply voltage is lower than the lower operating voltage limit of the flash EEPROM, a microcomputer described in Japanese Laid-Open Patent Publication No. 2002-7374 is conventionally known. In general, the operating voltage range of a RAM is wider than that of a flash EEPROM. Therefore, the microcomputer described in Japanese Laid-Open Patent Publication No. 2002-7374 includes a RAM for storing a part of a program, and is provided with a supply voltage which is lower than the lower operating voltage limit of the built-in flash EEPROM. The microcomputer internally boosts the provided supply voltage and transfers the program stored in the flash EEPROM to the RAM. After the transfer of the program, the microcomputer stops boosting the voltage and executes the program stored in the RAM. Thus, the power consumption of the microcomputer can be reduced.

However, with the above-described conventional microcomputer with a built-in flash EEPROM, the central processing unit (hereinafter, referred to as a "CPU") needs to be stopped when transferring the program stored in the flash EEPROM. By contrast, with a microcomputer with a built-in mask ROM, the program does not need to be transferred and so the CPU does not need to be stopped. Therefore, in system development and mass production using both the above-described conventional microcomputer with a built-in flash EEPROM and a microcomputer with a built-in mask ROM, the operations of the two types of microcomputers cannot be matched although the two types of microcomputers can be operated at the same supply voltage.

With the conventional microcomputer with a built-in flash EEPROM, for rewriting the program stored in the flash EEPROM 20, it is necessary to use the CPU exclusively for that operation. Thus, it is impossible to rewrite the program stored in the flash EEPROM without stopping the CPU.

SUMMARY OF THE INVENTION

Therefore, an object of the present invention is to provide a microcomputer operable even when the supply voltage is lower than the lower operating voltage limit of a built-in nonvolatile memory and thus operating in the same manner as a microcomputer with a built-in ROM. Another object of the present invention is to provide a microcomputer allowing a program stored in a built-in nonvolatile memory to be rewritten without stopping a CPU.

A microcomputer according to the present invention is a microcomputer with a built-in electrically rewritable nonvolatile memory. The microcomputer comprises a CPU; an electrically rewritable nonvolatile memory for storing a program executable by the CPU; a plurality of volatile memories having a smaller capacity than that of the nonvolatile memory; a system bus for connecting the CPU, the nonvolatile memory, and the plurality of volatile memories; a program transfer bus provided separately from the system bus for connecting the nonvolatile memory and the plurality of volatile memories; a program transfer section for transferring a part of the program stored in the nonvolatile memory to the plurality of volatile memories using the program transfer bus; an address conversion section for converting an address in the nonvolatile memory which is output from the CPU into an address in each of the plurality of volatile memories; and a voltage detection section for detecting a supply voltage which is to be provided to the nonvolatile memory. The plurality of volatile memories include a plurality of memories usable as a transfer memory and an execution memory in a switched manner in accordance with an execution state of the program by the CPU. In the state where the voltage detected by the voltage detection section is lower than a first voltage, the program transfer section transfers the part of the program stored in the nonvolatile memory to the transfer memory, and the address conversion section converts the address in the nonvolatile memory which is output from the CPU into an address in the execution memory.

In this case, the program transfer section may access the nonvolatile memory when the CPU is not accessing the nonvolatile memory.

The microcomputer may further comprise a voltage boost section for boosting the supply voltage to be provided to the nonvolatile memory when the voltage detected by the voltage detection section is lower than the first voltage. Preferably, the voltage boost section boosts the supply voltage to be provided to the nonvolatile memory when the voltage detected by the voltage detection section is lower than the first voltage and further the program transfer section performs program transfer.

In the state where the voltage detected by the voltage detection section is between the first voltage and a second voltage which is higher than the first voltage, the program transfer section may perform program transfer and the address conversion section may not perform address conversion.

The first voltage may be equal to a lower operating voltage limit of the nonvolatile memory, or may be higher than the lower operating voltage limit of the nonvolatile memory.

Among the plurality of volatile memories, a memory storing a part of the program which has been already executed by the CPU may be used as the transfer memory, and a memory storing a part of the program to be executed by the CPU may be used as the execution memory. In this case, the transfer memory and the execution memory are preferably switched to each other when the CPU completes execution of a predetermined range of the program.

Especially in the state where the voltage detected by the voltage detection section is lower than the first voltage, the transfer memory and the execution memory are preferably switched to each other when the CPU completes execution of the part of the program stored in the execution memory. In the state where the voltage detected by the voltage detection section is between the first voltage and a second voltage which is higher than the first voltage, it is preferable that the program transfer section performs program transfer, the address conversion section does not perform address conversion, and the transfer memory and the execution memory are switched to each other when the CPU completes execution of a part of the program which was stored in the nonvolatile memory, the part being stored in the execution memory.

The nonvolatile memory may store a sub routine program as a part of the program executable by the CPU; the plurality of volatile memories may include a sub routine program memory which is used neither as the transfer memory nor as the execution memory; and the program transfer section may transfer the sub routine program stored in the nonvolatile memory to the sub routine program memory before the voltage detected by the voltage detection section becomes lower than the first voltage.

The nonvolatile memory may store an interrupt vector table as a part of the program executable by the CPU; among the plurality of volatile memories, the memories usable as the transfer memory and the execution memory may each have an interrupt vector table area; and the program transfer section may transfer the interrupt vector table stored in the nonvolatile memory to the interrupt vector table area of each of the volatile memories usable as the transfer memory and the execution memory before the voltage detected by the voltage detection section becomes lower than the first voltage.

The microcomputer may further comprise an external interface section connected to the program transfer bus for communicating with a nonvolatile memory rewriting device externally provided to the microcomputer.

According to a microcomputer of the present invention, in the state where the supply voltage is lower than the first voltage, the program stored in the built-in nonvolatile memory is transferred to a volatile memory, and the CPU executes the program stored in a volatile memory. Accordingly, by setting the first voltage to the lower operating voltage limit of the nonvolatile memory (or a voltage higher than the lower operating voltage limit), the microcomputer can operate even in the state where the supply voltage is lower than the lower operation voltage limit of the built-in nonvolatile memory.

In an embodiment where the program transfer section accesses the nonvolatile memory while the CPU is not accessing the nonvolatile memory, the operation of the CPU is not disturbed by the program transfer. Therefore, the operation of the microcomputer with a built-in nonvolatile memory can be matched to the operation of a microcomputer with a built-in ROM.

In an embodiment where the voltage boost section is included, a voltage to be provided to the nonvolatile memory can be generated inside the microcomputer when the supply voltage is too low. In an embodiment where the voltage boost section operates for program transfer, the power consumption of the microcomputer can be reduced.

In an embodiment where program transfer is performed even when the supply voltage is between the first voltage and the second voltage, the execution of the program can be continued without stopping the CPU even when the supply voltage becomes lower than the first voltage at an arbitrary timing.

In an embodiment where a volatile memory storing a part of the program already executed is used as the transfer memory and a volatile memory storing a part of the program to be executed is used as the execution memory, a plurality of small capacity volatile memories can be used so as to act together as one large capacity nonvolatile memory, and thus the total capacity of the volatile memories built in the microcomputer can be reduced.

In an embodiment where the transfer memory and the execution memory are switched to each other when the CPU completes the execution of a predetermined range of the program, the program transfer can be started quickly, so that before the CPU completes the execution of one part of the program, the program transfer of the next part of the program can be completed.

In an embodiment where the sub routine program is transferred in advance to the sub routine program memory, the CPU can correctly execute a complicated program including the process of calling the sub routine even while the program stored in the volatile memories is being executed.

In an embodiment where the interrupt vector is transferred in advance to the interrupt vector table areas, the CPU can correctly execute the interrupt processing even while executing the program stored in the volatile memories.

In an embodiment where the external interface section is included, the program stored in the nonvolatile memory can be rewritten even while the CPU is executing the program stored in the nonvolatile memory without stopping the CPU.

As described above, the present invention can provide a microcomputer operable even when the supply voltage is lower than the lower operating voltage limit of a built-in nonvolatile memory and thus operating in the same manner as a microcomputer with a built-in ROM, and a microcomputer allowing a program stored in a built-in nonvolatile memory to be rewritten without stopping a CPU. By developing and mass-producing a system using both such a microcomputer and a microcomputer with a built-in ROM, the problem that the operations of the two types of microcomputers do not match each other is solved, and thus the reduction in the period of system development and the reduction in the cost of system development can be both achieved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart illustrating an operation of the microcomputer shown in FIG. 1;

FIG. 5A through FIG. 5G are schematic views showing the operation of the microcomputer shown in FIG. 1 in the second state;

FIG. 7A through FIG. 7D show an operation of an address conversion circuit of the microcomputer shown in FIG. 1;

FIG. 8 is a timing diagram of the microcomputer shown in FIG. 1;

DESCRIPTION OF THE PREFERRED EMBODIMENTS

First Embodiment

Figure 1:
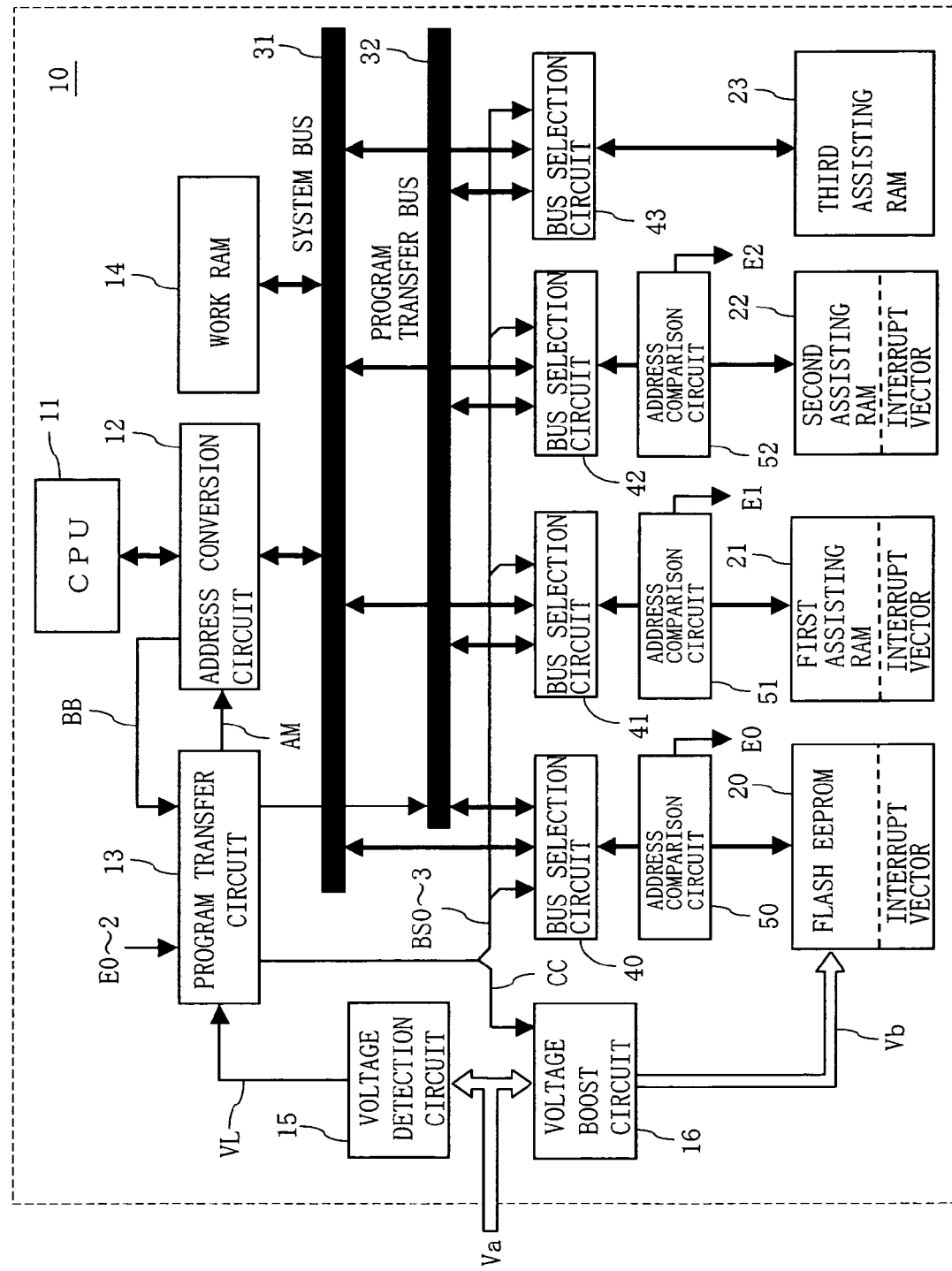
FIG. 1 is a block diagram showing a structure of a microcomputer with a built-in flash EEPROM according to a first embodiment of the present invention.

FIG. 1 is a diagram showing a structure of a microcomputer 10 with a built-in flash EEPROM according to a first embodiment of the present invention. The microcomputer 10 shown in FIG. 1 includes a CPU 11, an address conversion circuit 12, a program transfer circuit 13, a work RAM 14, a voltage detection circuit 15, a voltage boost circuit 16, a flash EEPROM 20, first through third assisting RAMs 21 through 23, a system bus 31, a program transfer bus 32, bus selection circuits 40 through 43, and address comparison circuits 50 through 52.

The CPU 11 is a central processing unit included in the microcomputer 10. The flash EEPROM 20 is a nonvolatile memory which is electrically rewritable by a predetermined unit (referred to as a "block"). The flash EEPROM 20 stores a program which is executable by the CPU 11. The program executable by the CPU 11 includes a main program, a sub routine program called from the main program, and an interrupt vector table for processing an interrupt which occurs irregularly. The work RAM 14 is a volatile memory storing operation data which is required by the CPU 11 for executing the program. The CPU 11, the work RAM 14 and the flash EEPROM 20 are connected to the system bus 31. The CPU 11 reads the program stored in the flash EEPROM using the system bus 31 and reads data from or writes data to the work RAM 14, thereby executing predetermined processing. The above-described points are the same as those of a general microcomputer with a built-in flash EEPROM.

The microcomputer 10 has a feature of being capable of correctly executing the program stored in the flash EEPROM 20 even when the provided supply voltage is lower than the lower operating voltage limit of the flash EEPROM. Among the elements shown in FIG. 1, the address conversion circuit 12, the program transfer circuit 13, the voltage detection circuit 15, the voltage boost circuit 16, the first through third assisting RAMs 21 through 23, the program transfer bus 32, the bus selection circuits 40 through 43, and the address comparison circuits 50 through 52 are provided for realizing the above-mentioned feature. In the following description, the supply voltage externally provided to the microcomputer 10 will be represented by "Va", and the lower operating voltage limit of the flash EEPROM will be represented by "V1". The supply voltage Va is higher than the voltage V1 in an initial state, but decreases as the time passes and finally becomes lower than the voltage V1.

In the state where the supply voltage Va is lower than the voltage V1, the CPU 11 executes the program stored in the first and second assisting RAMs 21 and 22, instead of the program stored in the flash EEPROM 20. Therefore, the program transfer circuit 13 transfers the program stored in the flash EEPROM 20 to the first and second assisting RAMs 21 and 22. Since the flash EEPROM 20 does not operate in the state where the supply voltage Va is lower than the voltage V1, the voltage boost circuit 16 boosts the supply voltage provided to the flash EEPROM 20 at a predetermined timing.

The program execution by the CPU 11 and the program transfer by the program transfer circuit 13 are performed in parallel. In more detail, one of the first and second assisting RAMs 21 and 22 is selected as a transfer memory and the other of the first and second assisting RAMs 21 and 22 is selected as an execution memory. The program transfer circuit 13 transfers the program to the transfer memory, and the CPU 11 executes the program stored in the execution memory. The transfer memory and the execution memory are switched to each other when the CPU 11 completes the execution of the program stored in the execution memory.

The program transfer by the program transfer circuit 13 is started before the supply voltage Va becomes lower than the voltage V1. In more detail, a voltage V2 which is higher than the voltage V1 is selected as a transfer start voltage. The program transfer circuit 13 performs program transfer even in the state where the supply voltage Va is between the voltages V1 and V2, like in the state where the supply voltage Va is lower than the voltage V1. When the supply voltage Va is between the voltages V1 and V2, however, the CPU 11 executes the program stored in the flash EEPROM 20.

The microcomputer 10 having the above-described structure can correctly execute the program stored in the flash EEPROM 20 even when the supply voltage Va is lower than the voltage V1. As the value of the transfer start voltage V2, a value with which the processing described below (steps S121 through S126 shown in FIG. 3) can be completed while the supply voltage Va is decreased from the voltage V2 to the voltage V1.

Hereinafter, with reference to FIG. 1, characteristic elements of the microcomputer 10 will be described. The voltage detection circuit 15 detects the level of the supply voltage Va provided to the microcomputer 10, and outputs a supply voltage level signal VL indicating the detected level to the program transfer circuit 13. The program transfer circuit 13 performs the program transfer described below based on the supply voltage level signal VL or the like. In addition, the program transfer circuit 13 performs control to boost the supply voltage provided to the flash EEPROM 20. In more detail, the program transfer circuit 13 outputs a voltage boost control signal CC indicating whether the voltage is to be boosted or not, and the voltage boost circuit 16 boosts the supply voltage Va to a level equal to or higher than the voltage V1 in accordance with the voltage boost control signal CC. A post-boost voltage Vb as a result of such selective voltage boosting performed by the voltage boost circuit 16 is provided to the flash EEPROM 20. When the voltage boost circuit 16 does not operate, the post-boost voltage Vb matches the supply voltage Va.

The first through third assisting RAMs 21 through 23 are volatile memories having a smaller capacity than that of the flash EEPROM 20. The content of each of the first through third assisting RAMs 21 through 23 is unfixed in an initial state. When the supply voltage Va is decreased, a part of the program stored in the flash EEPROM 20 is transferred to the first through third assisting RAMs 21 through 23. In more detail, the first and second assisting RAMs 21 and 22 both have an interrupt vector table area and a program storage area. An interrupt vector table stored in the flash EEPROM 20 is transferred to the interrupt vector table area of each of the first and second assisting RAMS 21 and 22. The main program stored in the flash EEPROM 20 is divided so as to have a size of the program storage area (hereinafter, the main program in such a divided state will be referred to as a "program segment"), and the program segments are transferred to the program storage areas of the first and second assisting RAMs 21 and 22, alternately. To the third assisting RAM 23, the subroutine program stored in the flash EEPROM 20 is transferred.

The first through third assisting RAMs 21 through 23 are connected to the system bus 31 so as to be accessible by the CPU 11. As a result, the system bus 31 is connected to the CPU 11, the work RAM 14, the flash EEPROM 20, and the first through third assisting RAMs 21 through 23. The program transfer bus 32 is a bus separately provided from the system bus 31. The program transfer bus 32 is connected to the flash EEPROM 20 and the first through third assisting RAMs 21 through 23. The program transfer bus 23 is used for program transfer performed by the program transfer circuit 13, and is not used for program execution performed by the CPU 11.

The bus selection circuit 40 is provided in correspondence with the flash EEPROM 20. The bus selection circuits 41 through 43 are respectively provided in correspondence with the first through third assisting RAMs 21 through 23. The bus selection circuits 40 through 43 connect the flash EEPROM 20 and the first through third assisting RAMs 21 through 23 to the system bus 31 or the program transfer bus 32 respectively in accordance with bus selection signals BS0 through BS3 which are output from the program transfer circuit 13.

For program execution, the CPU 11 constantly outputs an address in the flash EEPROM 20. The address conversion circuit 12 converts the address in the flash EEPROM 20 which is output from the CPU 11 into an address in each of the first through third assisting RAMs 21 through 23 when necessary, in accordance with an address conversion mode signal AM which is output from the program transfer circuit 13. The address conversion circuit 12 outputs a bus busy signal BB, indicating that the CPU 11 is using the system bus 31, to the program transfer circuit 13. The details of the address conversion circuit 12 will be described later (see FIG. 7A through FIG. 7D).

The address comparison circuit 50 compares a reading address in the flash EEPROM 20 and a final address of a program segment. When the two addresses match each other, the address comparison circuit 50 outputs the final address detection signal E0 indicating that the two addresses match each other. The address comparison circuit 51 compares a reading address in the first assisting RAM 21 and a final address of the first assisting RAM 21. When the two addresses match each other, the address comparison circuit 51 outputs a final address detection signal E1 indicating that the two addresses match each other. The address comparison circuit 52 compares a reading address in the second assisting RAM 22 and a final address of the second assisting RAM 22. When the two addresses match each other, the address comparison circuit 52 outputs a final address detection signal E2 indicating that the two addresses match each other. When one of the final address detection signals E0 through E2 is output, the program transfer circuit 13 starts program transfer.

Figure 2:
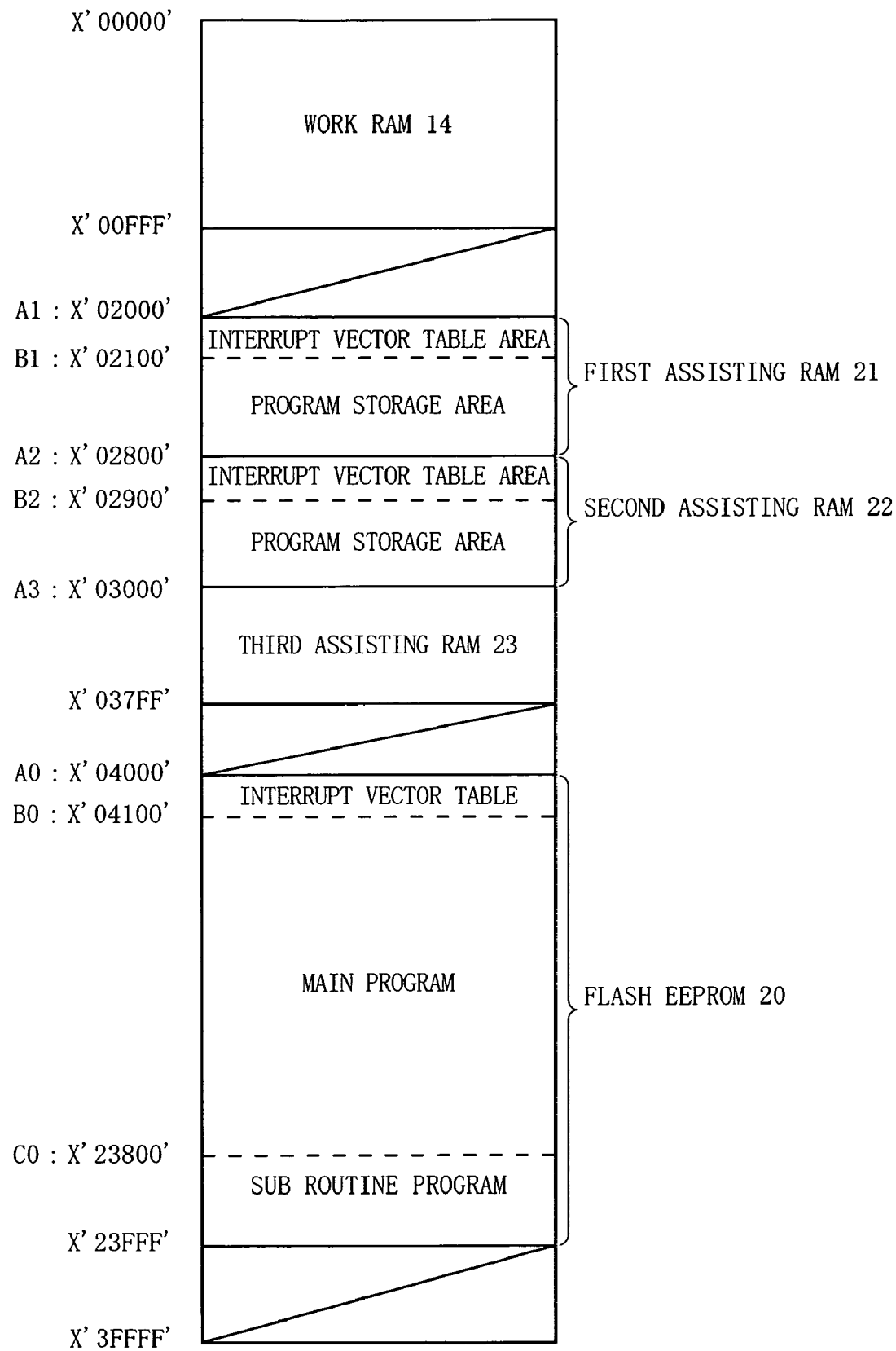
FIG. 2 shows a memory map of the microcomputer shown in FIG. 1.

FIG. 2 shows a memory map of the microcomputer 10. As shown in FIG. 2, the work RAM 14, the flash EEPROM 20 and the first through third assisting RAMs 21 through 23 are mapped to one address space. In the following description, the leading address of the work RAM 14 will be represented by "0", the leading address of the flash EEPROM 20 will be represented by "A0", and the leading addresses of the first through third assisting RAMs 21 through 23 will be respectively represented by "A1" through "A3". The flash EEPROM 20 stores the interrupt vector table starting from the address A0, the main program starting from an address B0, and the sub routine program starting from an address C0. The first assisting RAM 21 includes the interrupt vector table area starting from the address A1 and the program storage area starting from an address B1. The second assisting RAM 22 includes the interrupt vector table area starting from the address A2 and the program storage area starting from an address B2. FIG. 2 shows specific values of the leading address or the final address of each memory or area with the hexadecimal representation as an example.

Hereinafter, with reference to FIG. 3 through FIG. 6F, an operation of the microcomputer 10 will be described in the case where the supply voltage Va is changed from the state of being higher than the voltage V2 to the state of being lower than the voltage V2 and then to the state of being lower than the voltage V1. FIG. 3 is a flowchart illustrating an operation of the microcomputer 10. FIG. 4A through FIG. 6F are schematic views showing an operation of the microcomputer 10. In FIG. 4A through FIG. 6F, "VECT" represents the interrupt vector table, "SUB" represents the sub routine program, and "PRGC" and "PRGi" (i is a non-negative integer) represent a program segment.

As shown in FIG. 3, the microcomputer 10 assumes one of first through third states ST1 through ST3 in accordance with the supply voltage Va. In each state, the CPU 11 and the program transfer circuit 13 operate in parallel. FIG. 3 shows the operation of the CPU 11 in the left half thereof, and the operation of the program transfer circuit 13 in the right half thereof. While the supply voltage Va is equal to or higher than the voltage V2, the microcomputer 10 is in the first state ST1. In this state, the CPU 11 executes the operation in step S110 in repetition, and the program transfer circuit 13 is at a stop. When the supply voltage Va becomes lower than the voltage V2 (YES in step S101), the state of the microcomputer 10 is transited to the second state ST2. In this state, the CPU 11 executes the operation in step S120 in repetition, and the program transfer circuit 13 executes the operation in steps S121 through S123 once and then executes the operation in steps S124 through S126 in repetition. When the supply voltage Va becomes lower than the voltage V1 (YES in step S102), the state of the microcomputer is transited into the third state ST3. In this state, the CPU 11 executes the operation in step S130 in repetition, and the program transfer circuit 13 executes the operation in steps S131 through S135 in repetition.

Figure 4A:
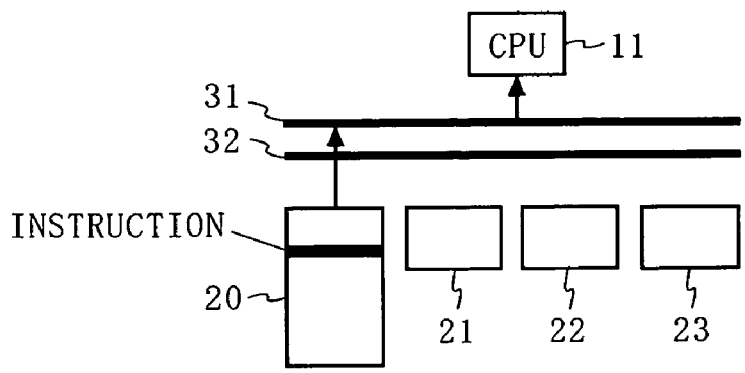
FIG. 4A through FIG. 4D are schematic views showing an operation of the microcomputer shown in FIG. 1 in a first state and a second state.

The details of each step shown in FIG. 3 are as follows. In the first state ST1, the CPU 11 executes the program stored in the flash EEPROM 20 (step S110). In step S110, as shown in FIG. 4A, the CPU 11 sequentially reads instructions included in the program stored in the flash EEPROM 20 via the system bus 31 and executes the instructions. In step S110, the CPU 11 executes the main program stored in the flash EEPROM 20 and also the sub routine program stored in the flash EEPROM 20. The CPU 11 performs interrupt processing using the interrupt vector table stored in the flash EEPROM 20.

Figure 4B:
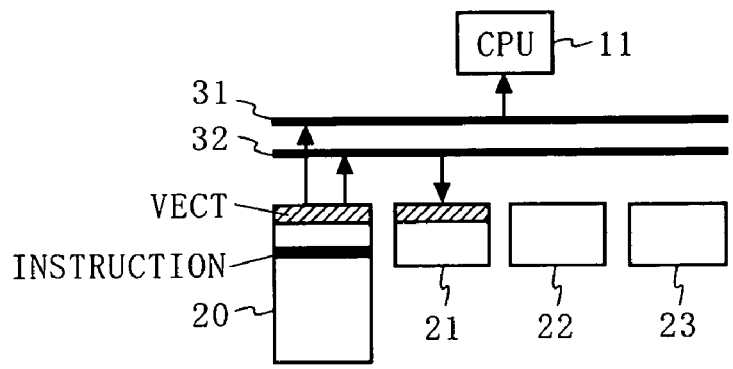
Figure 4C:
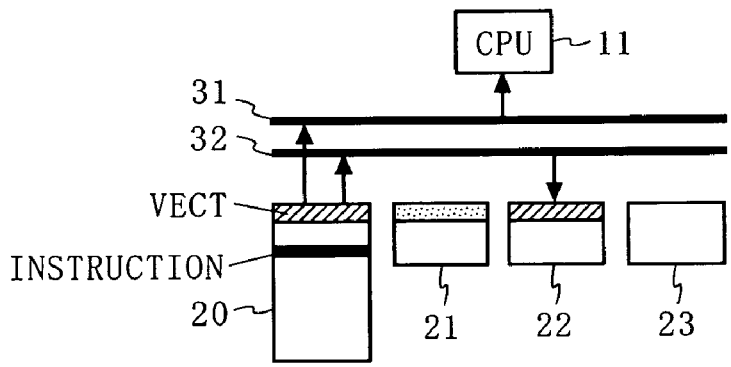
Figure 4D:
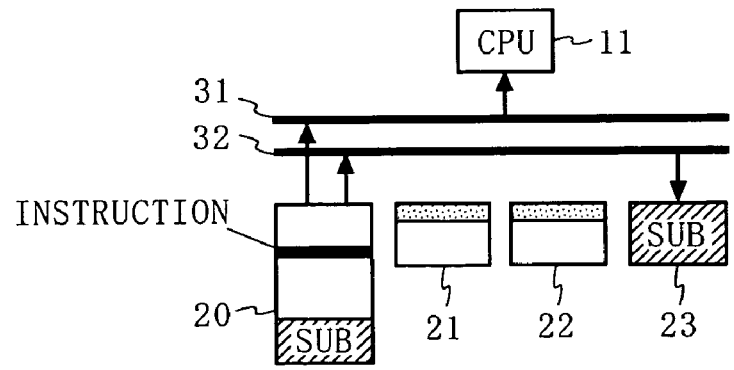

In the second state ST2, in parallel with the program execution performed by the CPU 11, the program transfer circuit 13 executes program transfer in preparation for the time when the supply voltage Va becomes lower than the voltage V1. In more detail, the CPU 11 continues executing the program stored in the flash EEPROM 20 even in the second state ST2 (step S120). The program transfer circuit 13 first transfers the interrupt vector table stored in the flash EEPROM 20 to the first and second assisting RAMS 21 and 22 (step S121), and transfers the sub routine program stored in the flash EEPROM 20 to the third assisting RAM 23 (step S122). In step S121, as shown in FIG. 4B and FIG. 4C, the interrupt vector table stored in the flash EEPROM 20 is transferred to the interrupt vector table area of each of the first and second assisting RAMs 21 and 22. In step S122, as shown in FIG. 4D, the sub routine program stored in the flash EEPROM 20 is transferred to the third assisting RAM 23. In steps S121 and S122, the program transfer circuit 13 accesses the flash EEPROM 20 when the CPU 11 is not accessing the flash EEPROM 20, based on the bus busy signal BB.

Next, the program transfer circuit 13 allocates one of the first and second assisting RAMs 21 and 22 to a transfer memory, and allocates the other of the first and second assisting RAMs 21 and 22 to an execution memory (step S123). In step S123, for example, the first assisting RAM 21 is allocated to the execution memory and the second assisting RAM 22 is allocated to the transfer memory.

Next, the program transfer circuit 13 waits until the CPU 11 completes the execution of a program segment (step S124). When the CPU 11 completes the execution of the program segment, the reading address in the flash EEPROM 20 and the final address of the program segment match each other, and the address comparison circuit 50 outputs the final address detection signal E0. Accordingly, in step S124, the program transfer circuit 13 can wait until the final address detection signal E0 is output.

Then, the program transfer circuit 13 switches the transfer memory and the execution memory to each other (step S125), and transfers a program segment in the main program stored in the flash EEPROM 20 which is next to the program segment that is being executed by the CPU 11 to the new transfer memory (step S126). Also in step S126, the program transfer circuit 13 accesses the flash EEPROM 20 when the CPU 11 is not accessing the flash EEPROM 20 based on the bus busy signal BB.

As an example, a case where the CPU 11 completes the execution of the n'th program segment in the state where the first assisting RAM 21 is allocated to the execution memory and the second assisting RAM 22 is allocated to the transfer memory will be discussed. In this case, at the time when the execution of the n'th program segment is completed, the first assisting RAM 21 stores the n'th program segment and the second assisting RAM 22 stores the (n+1)th program segment. Therefore, after allocating the first assisting RAM 21 to the transfer memory and the second assisting RAM 22 to the execution memory in step S125, the program transfer circuit 13 transfers the (n+2)th program segment stored in the flash EEPROM 20 to the first assisting RAM 21, which is a new transfer memory, in step S126. In this manner, the third time the program transfer circuit 13 executes the operation in step S126 and thereafter, the program transfer circuit 13 transfers a program segment, which is two program segments after the program segment which has been stored in the transfer memory, to the transfer memory.

Next, the program transfer circuit 13 returns to step S124 and executes the operation in steps S124 through S126 in repetition until the state of the microcomputer 10 is transited to the third state ST3. As described above, in the second state ST2, a program segment next to the program segment which is being executed by the CPU 11 is transferred to the first or second assisting RAM 21 or 22, which is not being accessed by the CPU 11.

With reference to FIG. 5A through FIG. 5G, specific examples of steps S124 through S126 will be described. It is assumed here that when the program transfer circuit 13 executes the operation in step S123, the CPU 11 is executing a program segment PRGC and is scheduled to sequentially execute program segments PRG0, PRG1, PRG2, . . . after the program segment PRGC. It is also assumed that in step S123, the first assisting RAM 21 is allocated to the execution memory and the second assisting RAM 22 is allocated to the transfer memory.

After executing the operation in step S123, the program transfer circuit 13 waits in step S124 until the CPU 11 completes the execution of the program segment PRGC. During this period, as shown in FIG. 5A, the CPU 11 executes the program stored in the flash EEPROM 20, but the program transfer to any of the first and second assisting RAMs 21 and 22 is not performed.

When the CPU 11 completes the execution of the program segment PRGC, in step S125, the first assisting RAM 21 is allocated to the transfer memory and the second assisting RAM 22 is allocated to the execution memory. In step S126, as shown in FIG. 5B, the program segment PRG1, i.e., the next program segment to the program segment PRG0 which is being executed by the CPU 11, is transferred from the flash EEPROM 20 to the program storage area of the first assisting RAM 21, which is the new transfer memory. When the transfer of the program segment PRG1 is completed, the program transfer circuit 13 waits until the CPU 11 completes the execution of the program segment PRG0. During this time, as shown in FIG. 5C, the CPU 11 executes the program stored in the flash EEPROM 20, but the program transfer to any of the first and second assisting RAMs 21 and 22 is not performed.

When the CPU 11 completes the execution of the program segment PRG0, in step S125, the first assisting RAM 21 is allocated to the execution memory and the second assisting RAM 22 is allocated to the transfer memory. In step S126, as shown in FIG. 5D, the program segment PRG2, i.e., the next program segment to the program segment PRG1 which is being executed by the CPU 11, is transferred from the flash EEPROM 20 to the program storage area of the second assisting RAM 22, which is the new transfer memory. When the transfer of the program segment PRG2 is completed, the program transfer circuit 13 waits until the CPU 11 completes the execution of the program segment PRG1. During this time, as shown in FIG. 5E, the CPU 11 executes the program stored in the flash EEPROM 20, but the program transfer to any of the first and second assisting RAMs 21 and 22 is not performed.

Similarly, when the CPU 11 completes the execution of the program segment PRG1, the first assisting RAM 21 is allocated to the transfer memory, and as shown in FIG. 5F, a program segment PRG3 is transferred from the flash EEPROM 20 to the program storage area of the first assisting RAM 21. When the CPU 11 completes the execution of the program segment PRG2, the second assisting RAM 22 is allocated to the transfer memory, and as shown in FIG. 5G, a program segment PRG4 is transferred from the flash EEPROM 20 to the program storage area of the second assisting RAM 22. After one program transfer is completed until the CPU 11 completes the execution of the program segment, the program transfer to any of the first and second assisting RAMs 21 and 22 is not performed as shown in FIG. 5E.

Returning to FIG. 3, the operation of the microcomputer 10 in the third state ST3 will be described. In the third state ST3, the supply voltage Va is lower than the voltage V1 (the lower operating voltage limit of the flash EEPROM 20), and the next program segment to be executed by the CPU 11 is stored in the first or second assisting RAM 21 or 22 which is the execution memory. Accordingly, in the third state ST3, the CPU 11 executes the program stored in the first through third assisting RAMs 21 through 23 (step S130).

In more detail, for executing the main program, the CPU 11 sequentially reads the instructions included in the program segment stored in the program storage area of the ex-execution memory via the system bus 31 and executes the instructions (see FIG. 6A through FIG. 6D). For executing the sub routine program, the CPU 11 sequentially reads instructions included in the sub routine program stored in the third assisting RAM 23 via the system bus 31 and executes the instructions (see FIG. 6E). For executing interrupt processing, the CPU 11 reads the interrupt vector stored in the interrupt vector table area of the execution memory and executes interrupt processing based on the read interrupt vector (see FIG. 6F). The address conversion circuit 12 controls from which one among the flash EEPROM 20 and the first through third assisting RAMS 21 through 23 the program is to be read. Therefore, the operation of the CPU 11, after the state of the microcomputer 10 is transited to the third state ST3, is not different from the operations of the CPU 11 in the first state ST1 and the second state ST2.

In the third state ST3, the program transfer circuit 13 executes the program transfer continuously from the second state ST2. The operation of the program transfer circuit 13 in the third state ST3 is substantially the same as that in the second state ST2. In more detail, in steps S131, S132 and S134, the program transfer circuit 13 performs substantially the same processing as that in steps S124 through S126, respectively. It should be noted, though, in step S131, the program transfer circuit 13 waits until the final address signal E1 or E2 is output. Before performing program transfer in step S134, the program transfer circuit 13 controls the voltage boost circuit 16 to start operating (step S133). After performing the program transfer in step S134, the program transfer circuit 13 controls the voltage boost circuit 16 to stop operating (step S135). The program transfer circuit 13 controls the voltage boost control signal CC to control the voltage boost circuit 16. In accordance with the voltage boost control signal CC, the voltage boost circuit 16 boosts the supply voltage Va to a level equal to or higher than the voltage V1. Thus, while the program transfer is being performed in step S134, the voltage boost circuit 16 operates and the flash EEPROM 20 is provided with a voltage equal to or higher than the lower voltage operating limit V1.

Then, the program transfer circuit 13 returns to step S131 and executes the operation in steps S131 through S135 in repetition. Thus, in the third state ST3, like in the second step ST2, a program segment next to the program segment which is being executed by the CPU 11 is transferred to the first or second assisting RAM 21 or 22 which is the not being accessed by the CPU 11.

With reference to FIG. 6A through FIG. 6F, specific examples of steps S131 through S135 will be described. It is assumed here that as shown in FIG. 5G, the supply voltage Va becomes lower than the voltage V1 while the CPU 11 is executing the program segment PRG3.

Figure 6A:
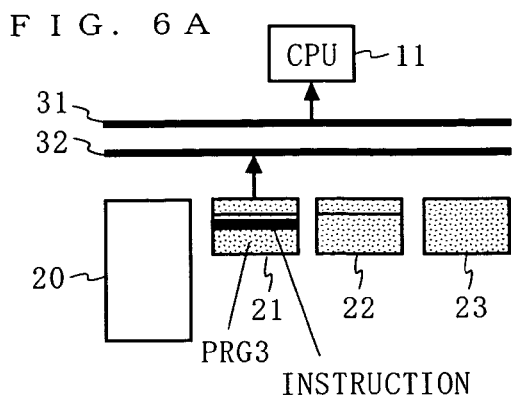
FIG. 6A through FIG. 6F are schematic views showing an operation of the microcomputer shown in FIG. 1 in a third state.

When the state of the microcomputer 10 is transited to the third state ST3, the CPU 11 reads the program from the first through third assisting RAMs 21 through 23, instead of from the flash EEPROM 20. In step S131, the program transfer circuit 13 waits until the CPU 11 completes the execution of the program segment PRG3. During this period, as shown in FIG. 6A, the CPU 11 executes the program stored in the first assisting RAM 21, which is the execution memory, but the program transfer to any of the first and second assisting RAMs 21 and 22 is not performed.

Figure 6C:
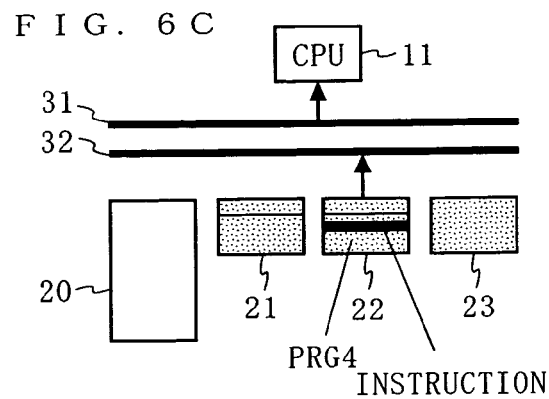
Figure 6B:
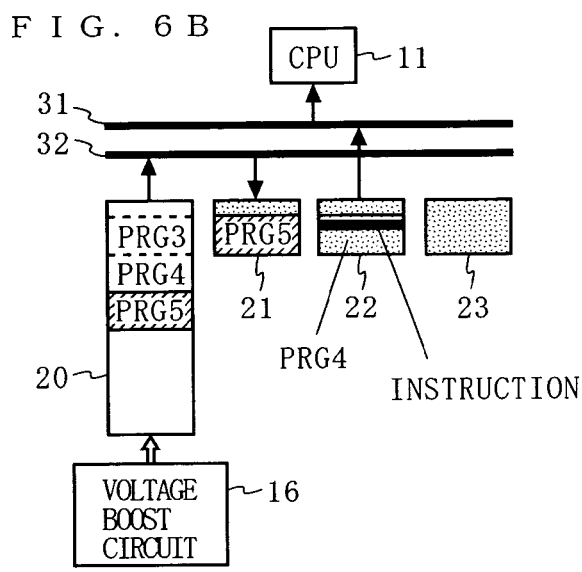

When the CPU 11 completes the execution of the program segment PRG3, in step S132, the first assisting RAM 21 is allocated to the transfer memory and the second assisting RAM 22 is allocated to the execution memory. In step S134, as shown in FIG. 6B, a program segment PRG5 is transferred from the flash EEPROM 20 to the program storage area of the first assisting RAM 21. While step S134 is being executed, the flash EEPROM 20 is provided with the voltage Vb which has been boosted to a level equal to or higher than the voltage V1 by the voltage boost circuit 16.

When the transfer of the program segment PRG5 is completed, the program transfer circuit 13 waits until the CPU 11 completes the execution of the program segment PRG4. During this time, as shown in FIG. 6C, the CPU 11 executes the program stored in the second assisting RAM 22, which is the execution memory, but the program transfer to any of the first and second assisting RAMs 21 and 22 is not performed.

Figure 6D:
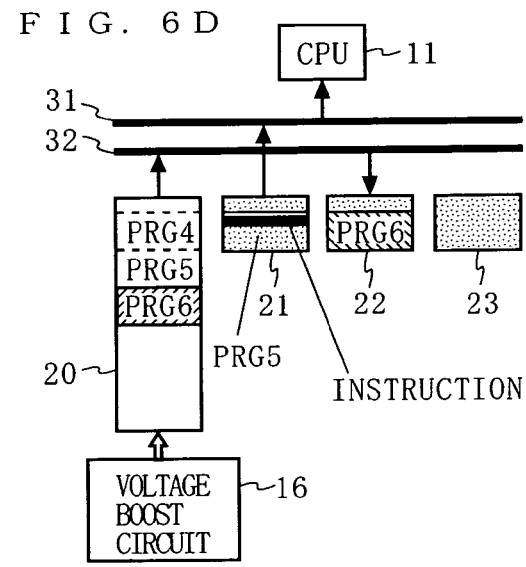

When the CPU 11 completes the execution of the program segment PRG4, in step S132, the first assisting RAM 21 is allocated to the execution memory and the second assisting RAM 22 is allocated to the transfer memory. In step S134, as shown in FIG. 6D, a program segment PRG6 is transferred from the flash EEPROM 20 to the program storage area of the second assisting RAM 22. In this case also, while the operation in step S134 is being executed, the flash EEPROM 20 is provided with the voltage Vb which has been boosted to a level equal to or higher than the voltage V1 by the voltage boost circuit 16.

Then, when the transfer of the program segment PRG6 is completed, the program transfer circuit 13 waits until the CPU 11 completes the execution of the program segment PRG5. During this time, as shown in FIG. 6A, the CPU 11 executes the program stored in the first assisting RAM 21, which is the execution memory, but the program transfer to any of the first and second assisting RAMs 21 and 22 is not performed.

Figure 6E:
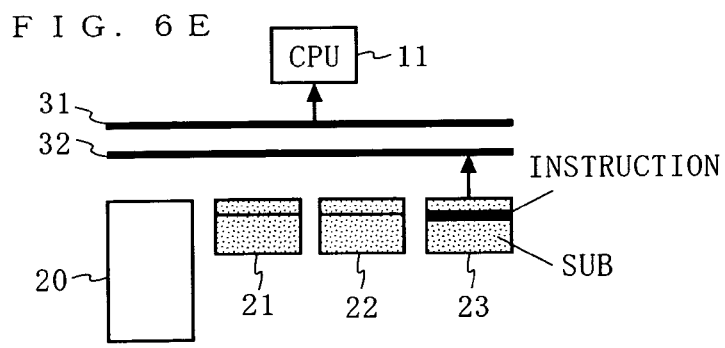

When the CPU 11 executes the sub routine program in step S130, the instructions included in the sub routine program are read from the third assisting RAM 23 as shown in FIG. 6E regardless of whether the first assisting RAM 21 or the second assisting RAM 22 is the execution memory.

Figure 6F:
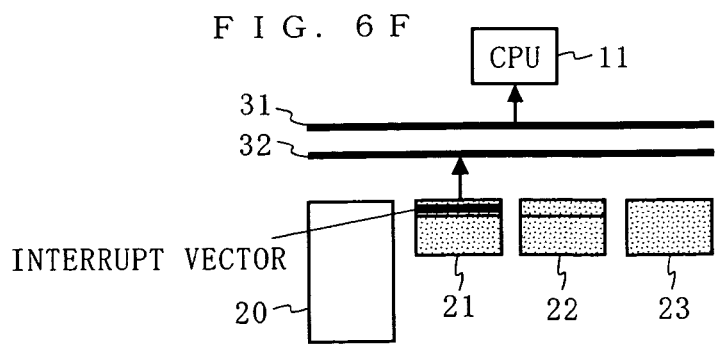

When the CPU 11 executes the interrupt processing in step S130, the interrupt vector is read from the interrupt vector table area of the execution memory. For example, when the first assisting RAM 21 is the execution memory, the interrupt vector is read from the interrupt vector table area of the first assisting RAM 21 as shown in FIG. 6F.

Hereinafter, with reference to FIG. 7A through FIG. 7D, the details of the address conversion circuit 12 will be described. The address conversion circuit 12 includes two registers (hereinafter, referred to as a "first register R1" and a "second register R2") for storing values necessary for address conversion. When the program transfer to the first assisting RAM 21 is started, a difference D1 between the leading address of the program segment to be transferred (an address in the flash EEPROM 20) and the leading address B1 of the program storage area of the first assisting RAM 21 is set in the first register R1. Similarly, when the program transfer to the second assisting RAM 22 is started, a difference D2 between the leading address of the program segment to be transferred (an address in the flash EEPROM 20) and the leading address B2 of the program storage area of the second assisting RAM 22 is set in the second register R2. The values D1 and D2 set in the first and second registers R1 and R2 are referred to by equations (3) and (4) described below.

For accessing any of the flash EEPROM 20 and the first through third assisting RAMs 21 through 23, the CPU 11 outputs an address in the flash EEPROM 20 (hereinafter, referred to as a "reading address X"). As described above, the address conversion circuit 12 converts the reading address X to an address in each of the first through third assisting RAMs 21 through 23 when necessary, in accordance with the address conversion mode signal AM which is output from the program transfer circuit 13. Hereinafter, the address which is output from the address conversion circuit 12 will be referred to as a "reference address Y".

In the case where the CPU 11 reads the interrupt vector from the first assisting RAM 21 (see FIG. 7A), the address conversion circuit 12 subtracts, from the reading address X, a difference between the leading address A0 of the area storing the interrupt vector table in the flash EEPROM 20 and the leading address A1 of the interrupt vector table area in the first assisting RAM 21. Namely, the reference address Y in this case is obtained by equation (1).

$$Y=X-(A0-A1) \quad (1)$$

Similarly, in the case where the CPU 11 reads the interrupt vector from the second assisting RAM 22, the address conversion circuit 12 subtracts, from the reading address X, a difference between the leading address A0 and the leading address A2 of the interrupt vector table area in the second assisting RAM 22. Namely, the reference address Y in this case is obtained by equation (2).

$$Y=X-(A0-A2) \quad (2)$$

It is assumed that in the case where the CPU reads the main program from the first assisting RAM 21 (see FIG. 7B), the program segment stored in the first assisting RAM 21 was stored in an area starting from an address P1 in the flash EEPROM 20. In this case, a difference D1 between the address P1 and the leading address B1 of the program storage area in the first assisting RAM 21 is stored in the first register R1. Thus, the address conversion circuit 12 subtracts the value D1 stored in the first register R1 from the reading address X. Namely, the reference address Y in this case is obtained by equation (3).

$$Y=X-(P1-B1)=X-D1 \quad (3)$$

Similarly, it is assumed that in the case where the CPU reads the main program from the second assisting RAM 22, the program segment stored in the second assisting RAM 22 was stored in an area starting from an address P2 in the flash EEPROM 20. In this case, a difference D2 between the address P2 and the leading address B2 of the program storage area in the second assisting RAM 22 is stored in the second register R2. Thus, the address conversion circuit 12 subtracts the value D2 stored in the second register R2 from the reading address X. Namely, the reference address Y in this case is obtained by equation (4).

$$Y=X-(P2-B2)=X-D2 \quad (4)$$

In the case where the CPU reads the sub routine program from the third assisting RAM 23 (see FIG. 7C), the address conversion circuit 12 subtracts, from the reading address X, a difference between the leading address C0 of the area storing the sub routine program in the flash EEPROM 20 and the leading address A3 of the third assisting RAM 23. Namely, the reference address Y in this case is obtained by equation (5).

$$Y=X-(C0-A3) \quad (5)$$

The above-described operation of the address conversion circuit 12 can be summarized as shown in FIG. 7D. The address conversion circuit 12 converts a reading address X which is output from the CPU 11 into a reference address Y in accordance with the table shown in FIG. 7D. Thus, the CPU 11 can correctly access the first through third assisting RAMs 21 through 23 by merely outputting an address in the flash EEPROM 20 without using the addresses in the first through third assisting RAMs 21 through 23.

Hereinafter, with reference to FIG. 8 through FIG. 10, an exemplary operation of the microcomputer 10 will be described. FIG. 8 is a timing diagram illustrating the manner in which each signal line changes when the microcomputer 10 operates as shown in FIG. 4A through FIG. 6F. In FIG. 8, the time at which the supply voltage Va becomes lower than the voltage V2 is represented with "Ta", and the time at which the supply voltage Va becomes lower than the voltage V1 is represented with "Tb". In other words, the microcomputer 10 is in the first state ST1 before time Ta, in the second state ST2 between time Ta and time Tb, and in the third state ST3 after the time Tb.

The voltage boost control signal CC is at an H level for operating the voltage boost circuit 16 and at an L level for stopping the voltage boost circuit 16. The address conversion mode signal AM is "0" when the microcomputer 10 is in the first state ST1 or the second state ST2, is "1" when the microcomputer 10 is in the third state ST3 and the first assisting RAM 21 is the execution memory, and is "2" when the microcomputer 10 is in the third state ST3 and the second assisting RAM 22 is the execution memory. The final address detection signals E0 through E2 are each output when the corresponding final address is detected.

The bus selection signals BS0 through BS3 are at the H level when the corresponding memory is connected to the system bus 31 and is at the L level when the corresponding memory is connected to the program transfer bus 32. The bus selection signal BS1 is at the L level while the interrupt vector table or a program segment is being transferred to the first assisting RAM 21. The bus selection signal BS2 is at the L level while the interrupt vector table or a program segment is being transferred to the second assisting RAM 22. The bus selection signal BS3 is at the L level while the sub routine program is being transferred to the third assisting RAM 23. The bus selection signal BS0 is at the L level when one of the bus selection signals BS1 through BS3 is at the L level and the bus busy signal BB is at the L level.

As shown in FIG. 8, when the CPU 11 completes the execution of, for example, the program segment PRGC, PRG0, PRG1 or the like stored in the flash EEPROM, the final address detection signal E0 is output. In accordance with this, the transfer memory and the execution memory are switched to each other, and a program segment next to the program segment which is being executed by the CPU 11 is transferred to the new transfer memory. For example, when the CPU 11 completes the execution of the program segment PRG1 at the time Tc, the first assisting RAM 21 is allocated to the transfer memory, the second assisting RAM 22 is allocated to the execution memory, and the next program segment PRG3 is transferred to the first assisting RAM 21 as the new transfer memory.

When the supply voltage Va becomes lower than the voltage V1, the address conversion mode signal AM is changed from 0 to 1 or 2. In the example shown in FIG. 8, at the time Tb when the supply voltage Va becomes lower than the voltage V1, the first assisting RAM 21 is the execution memory. Therefore, the address conversion mode signal AM is changed from 0 to 1 at the time Tb. After the time Tb, the CPU 11 accesses the first through third assisting RAMs 21 through 23 instead of the flash EEPROM 20.

In the third state ST3 in which the supply voltage Va is lower than the voltage V1, when the final address detection signal E1 or E2 is output, the transfer memory and the execution memory are switched to each other, and a program segment next to the program segment which is being executed by the CPU 11 is transferred to the new transfer memory. For example, when the CPU 11 completes the execution of the program segment PRG3, the first assisting RAM 21 is allocated to the transfer memory, the second assisting RAM 22 is allocated to the execution memory, and the next program segment PRG5 is transferred to the first assisting RAM 21 as the new transfer memory.

When the transfer of the program transfer is started in the second state ST2 or the third state ST3, the value D1 or D2 of the registers R1 or R2 is updated as shown in FIG. 8. In more detail, the value D1 of the first register R1 is updated by equation (6) and the value D2 of the second register R2 is updated by equation (7). In equations (6) and (7), P1 and P2 are each a leading address of a program segment to be transferred (an address in the flash EEPROM), B1 is the leading address of the program storage area in the first assisting RAM 21, and B2 is the leading address of the program storage area in the second assisting RAM 22.

$$D1 = P1 - B1 \quad (6)$$

$$D2 = P2 - B2 \quad (7)$$

Figure 9:
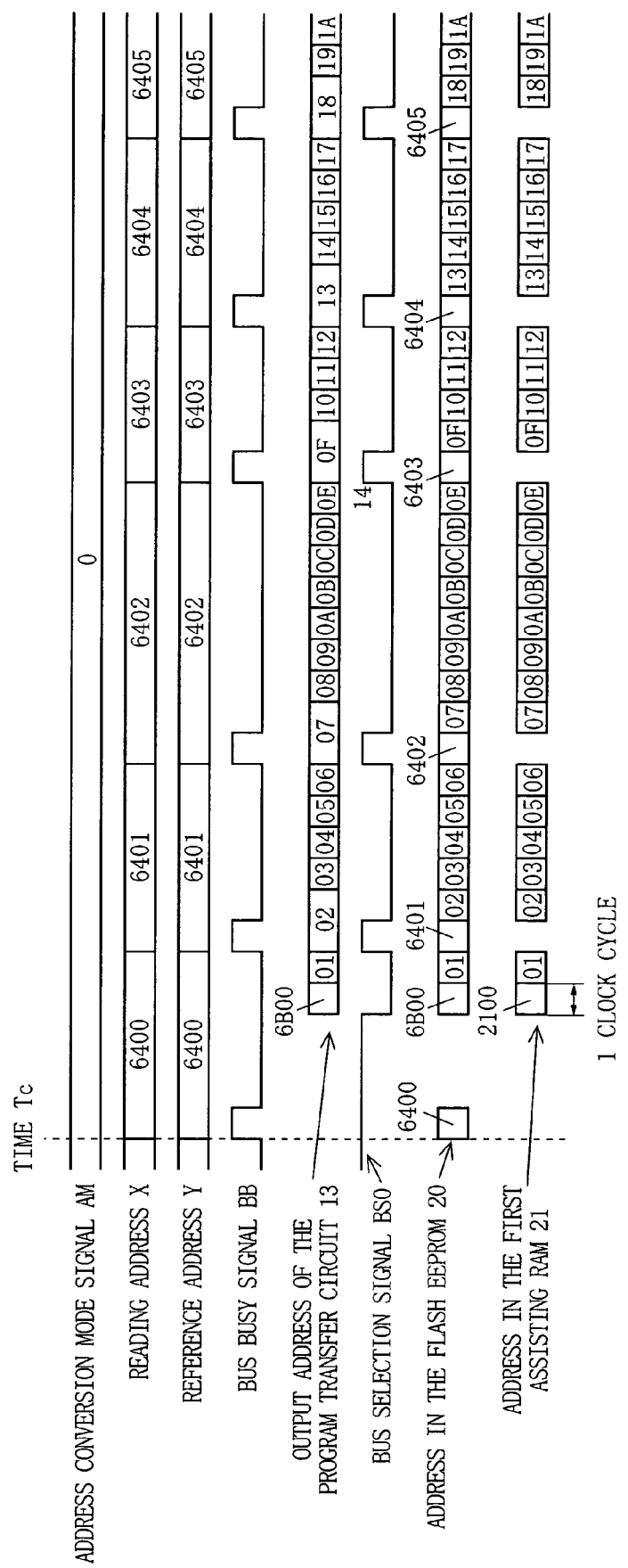
FIG. 9 is a detailed timing diagram of the microcomputer shown in FIG. 1.

FIG. 9 is a detailed timing diagram regarding the time after the time Tc. In FIG. 9, the leading address of the program segment PRG2 is X'6400' (the hexadecimal representation; this is also true with the other addresses starting from "X'"), the leading address of the program segment PRG3 is X'6B00', and the leading address B1 of the program storage area of the first assisting RAM 21 is X'2100'.

Both before and after the time Tc, the address conversion mode signal AM is 0. Therefore, the address conversion circuit 12 does not perform address conversion, and the reading address X which is output from the CPU 11 itself is the reference address Y.

The CPU 11 occasionally needs a plurality of clock cycles in order to execute one instruction which is read from the flash EEPROM 20. In this case, several clock cycles pass after the CPU 11 accesses the flash EEPROM 20 until the next time the CPU 11 accesses the flash EEPROM 20. In the clock cycle in which the CPU 11 accesses the flash EEPROM 20, the bus busy signal BB is at the H level as shown in FIG. 9.

As described above, the program transfer circuit 13 accesses the flash EEPROM 20 when the CPU 11 is not accessing the flash EEPROM 20. In more detail, the program transfer circuit 13 outputs addresses which increase one by one for program transfer. However, the program transfer circuit 13 does not increase the output address when the bus busy signal BB is at the H level in order to prioritize the access by the CPU 11.

In the example shown in FIG. 9, the program segment PRG3 to be transferred is stored at and after the address X'6B00' in the flash EEPROM 20. The program transfer circuit 13 outputs addresses which increase one by one from X'6B00'. However, in the clock cycle in which the CPU 11 accesses the flash EEPROM 20, the addresses X'6B02', X'6B07' and X'6B0F' and the like are output for two clocks in a row because the bus busy signal BB is at the H level.

Figure 10:
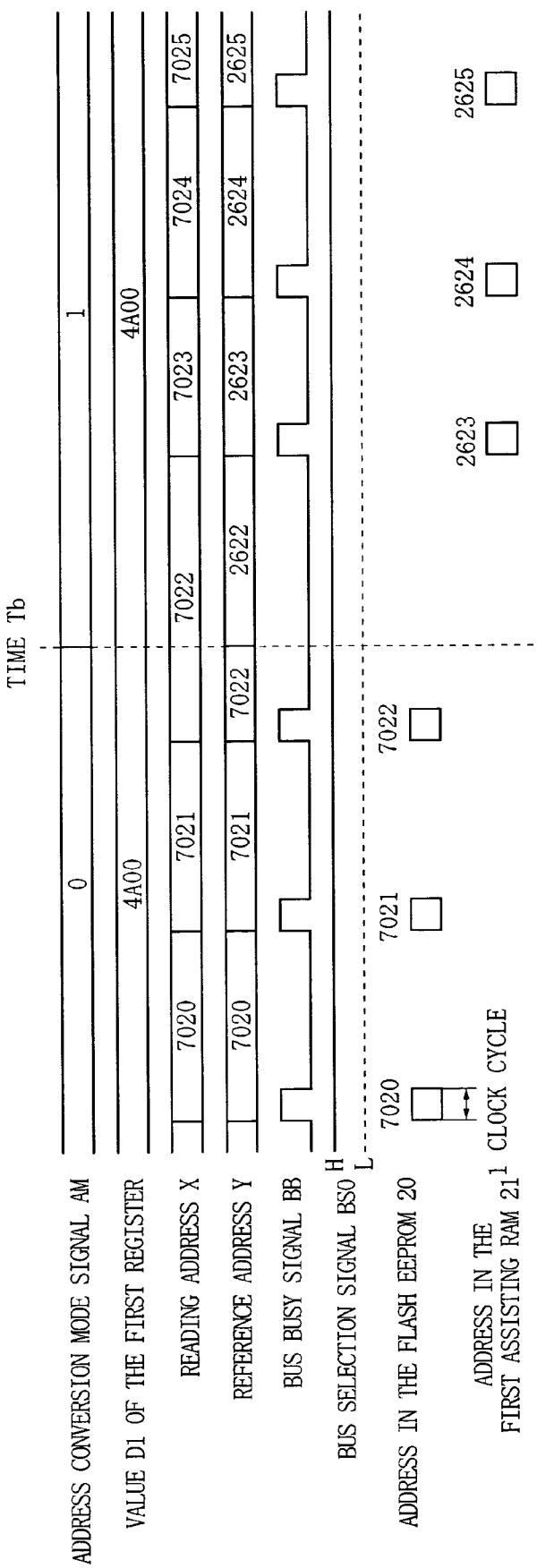
FIG. 10 is a detailed timing diagram of the microcomputer shown in FIG. 1.

FIG. 10 is a detailed timing diagram regarding the time before and after the time Tb. In FIG. 10, the leading address of the program segment PRG3 is X'6B00', the leading address of the program storage area in the first assisting RAM 21 is X'2100', and the supply voltage Va becomes lower than the voltage V1 while the CPU 11 is executing the instruction at the address X'7022'

Before the time Tb, the address conversion mode signal AM is 0. Therefore, the address conversion circuit 12 does not perform address conversion, and the reading address X which is output from the CPU 11 itself is the reference address Y. After the time Tb, the address conversion mode signal AM is 1. At the time Tb, the first register R1 stores a difference D1 (X'6B00'-X'2100'=X'4A00') between the leading address of the program segment PRG3 and the leading address B1 of the program storage area in the first assisting PAM 21. In addition, since the first assisting RAM 21 is the execution memory, the address conversion circuit 12 performs address conversion using equation (3). For example, when X'7203' is input as the reading address X, the address conversion circuit 12 outputs X'2603' as the reference address Y (X'7203'-X'4A00'=X'2603').

Accordingly, as shown in FIG. 10, the reference addresses Y are X'7020', X'7021', and X'7022' before the time Tb. The reference addresses Y are X'2622', X'2623', X'2624', and X'2625' after the time Tb. Therefore, the flash EEPROM 20 is accessed before the time Tb, and the first assisting RAM 21 is accessed after the time Tb.

In the above, the case where the CPU 11 reads the main program stored in the first assisting RAM 21 is described. The CPU 11 reads the program stored in the first through third assisting RAMs 21 through 23 in substantially the same manner. In this case also, the address conversion circuit 12 performs address conversion in accordance with the table shown in FIG. 7D, and therefore the CPU 11 can correctly access the first through third assisting RAMs 21 through 23 merely by outputting an address in the flash EEPROM 20.

The microcomputer 10 according to this embodiment can encompass the following modified examples. In the above description, the state of the microcomputer 10 is transited to the third state ST3 when the supply voltage Va becomes lower than the lower operating voltage limit V1. Alternatively, the state of the microcomputer 10 may be transited to the third state ST3 when the supply voltage Va becomes lower than a predetermined voltage V1' which is higher than the voltage V1. In this case, the transfer start voltage V2 is set to a value higher than the voltage V1'.

In the above description, the program transfer circuit 13 transfers the interrupt vector table and the sub routine program when the supply voltage Va becomes lower than the voltage V2. Alternatively, the program transfer circuit 13 may transfer the interrupt vector table and the sub routine program at an arbitrary time before the supply voltage Va becomes lower than the voltage V1. For example, the program transfer circuit 13 may transfer the interrupt vector table and the sub routine program in a state of waiting for oscillation after being reset.

In the above description, the program transfer circuit 13 is placed into a wait state immediately after transferring the interrupt vector table and the subroutine program. Alternatively, the program transfer circuit 13 may be placed into a wait state after transferring the interrupt vector table and the sub routine program and then transferring one or two program segments to the first assisting RAM 21 and/or the second assisting RAM 22.

In the above description, the program transfer circuit 13 transfers the interrupt vector table and the sub routine program in the specific order. Alternatively, the program transfer circuit 13 may transfer the interrupt vector table and the sub routine program in an arbitrary order, or may transfer the interrupt vector table simultaneously to the interrupt vector table areas of the first and second assisting RAMs 21 and 22.

In the above description, the microcomputer 10 includes the first and second assisting RAMS 21 and 22 as memories usable as the transfer memory and the execution memory in a switched manner. Alternatively, the microcomputer 10 may include three or more RAMs as memories usable as the transfer memory and the execution memory in a switched manner.

As described above, with the microcomputer according to this embodiment, in the state where the supply voltage is lower than the lower operating voltage limit of the flash EEPROM, the program stored in the flash EEPROM is transferred to the first and second assisting RAMs, and the CPU executes the program stored in the first and second assisting RAMs. Accordingly, the microcomputer is operable even in the state where the supply voltage is lower than the lower operating voltage limit of the flash EEPROM.

A program transfer section accesses the flash EEPROM when the CPU is not accessing the flash EEPROM. Therefore, the operation of the CPU is not disturbed by the program transfer. Accordingly, the operation of the microcomputer matches the operation of a microcomputer with a built-in ROM.

The microcomputer includes a voltage boost section. Therefore, an additional supply voltage to be provided to the flash EEPROM can be generated inside the microcomputer when the supply voltage is too low. Since the voltage boost section operates when program transfer is performed, the power consumption of the microcomputer can be reduced.

The program transfer is performed even in the state where the supply voltage is between the lower operating voltage limit of the flash EEPROM and the transfer start voltage. Therefore, even when the supply voltage is lower than the lower operating voltage limit of the flash EEPROM at an arbitrary timing, the CPU can continue the execution of the program without being stopped.

Among the first and second assisting RAMs, the assisting RAM storing the part of the program already executed is used as the transfer memory, and the assisting RAM storing the part of the program to be executed in the future is used as the execution memory. Therefore, a plurality of small capacity RAMs can be used so as to act together as one large capacity flash EEPROM, and thus the total capacity of the RAMs built in the microcomputer can be reduced.

When the CPU completes the execution of a predetermined range of the program, the transfer memory and the execution memory are switched to each other. Therefore, the program transfer can be quickly started, so that before the CPU completes the execution of one program segment, the program transfer of the next program segment can be completed.

Before the supply voltage becomes too low, the sub routine program is transferred to the third assisting RAM and the interrupt vector table is transferred to the interrupt vector table areas of the first and second assisting RAMs. Therefore, even while the program stored in the first and second assisting RAMs is being executed, the CPU can correctly execute a complicated program including the process of calling the sub routine and can correctly execute the interrupt processing.

As described above, according to this embodiment, a microcomputer which is operable even when the supply voltage is lower than the lower operating voltage limit of the built-in flash EEPROM and thus operates in the same manner as a microcomputer with a built-in ROM can be provided. When such a microcomputer and a microcomputer with a built-in mask ROM are used together for system development and mass production, the problem that the operations of the two types microcomputers do not match each other is solved. Thus, the reduction in the period of system development and the reduction in the cost of system development can be both achieved.

Second Embodiment

Figure 11:
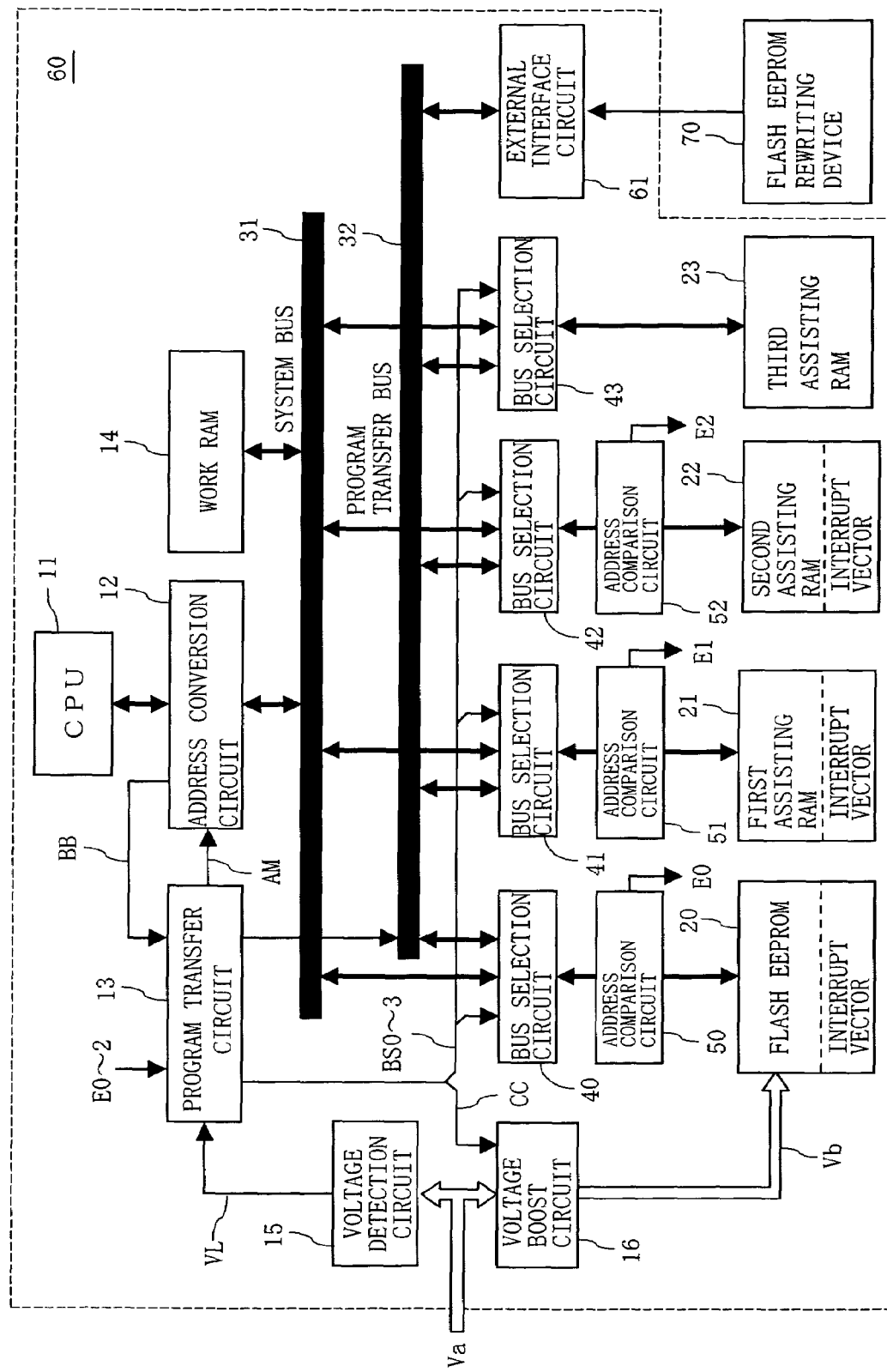
FIG. 11 shows a block diagram showing a structure of a microcomputer with a built-in flash EEPROM according to a second embodiment of the present invention.

FIG. 11 is a diagram showing a structure of a microcomputer 60 with a built-in flash EEPROM according to a second embodiment of the present invention. The microcomputer 60 shown in FIG. 11 includes an external interface circuit 61 in addition to the structure of the microcomputer 10 in the first embodiment (FIG. 1). Among the elements of the microcomputer 60 in the second embodiment, the elements identical to those of the microcomputer 10 in the first embodiment will bear identical reference numerals thereto and descriptions thereof will be omitted.

The microcomputer 60 has a feature of, even while the CPU 11 is executing a program stored in the flash EEPROM 20, being capable of rewriting the program. The program to be written into the flash EEPROM 20 is supplied from a flash EEPROM rewriting device 70 externally provided to the microcomputer 60. The external interface circuit 61 is connected to the program transfer bus 32, and sends and receives data to and from the flash EEPROM rewriting device 70.

The microcomputer 60 rewrites the program stored in the flash EEPROM 20 as follows. When the program transfer circuit 13 receives an instruction to rewrite the program, the program transfer circuit 13 transfers a program segment next to the program segment which is being executed by the CPU 11 at that point to the first or second assisting RAM 21 or 22 (here, the first assisting RAM 21). For this operation, the program transfer circuit 13 accesses the flash EEPROM 20 when the CPU 11 is not accessing the flash EEPROM 20, based on the bus busy signal BB.

When the CPU 11 completes the execution of a program segment and the final address detection signal E0 is output, the program transfer circuit 13 changes the address conversion mode signal AM from 0 to 1. By this change, the CPU 11 reads the program from the first assisting RAM 21 instead of from the flash EEPROM 20. At this point, the flash EEPROM 20 is connected to the program transfer bus 32.

A program to be written into the flash EEPROM 20 is supplied from the flash EEPROM rewriting device 70. The external interface circuit 61 communicates with the flash EEPROM rewriting device 70, and receives the program to be written into the flash EEPROM 20 by a predetermined unit. While the CPU 11 is executing the program stored in the first assisting RAM 21, the program transfer circuit 13 writes the program of the predetermined unit, which was received by the external interface circuit 61, into the flash EEPROM 20. Thus, the program stored in the flash EEPROM 20 is rewritten by the new program supplied from the flash EEPROM rewriting device 70.

When the rewriting of the program is completed, the program transfer circuit 13 changes the address conversion mode signal AM from 1 to 0. By this change, the CPU 11 reads the program from the flash EEPROM 20 instead of from the first assisting RAM 21. At this point, the flash EEPROM 20 is connected to the system bus 31. After this, the CPU 11 sequentially reads and executes instructions included in the post-rewriting program stored in the flash EEPROM 20.

As described above, owing to the external interface circuit, the microcomputer according to this embodiment can rewrite the program stored in the flash EEPROM even while the CPU is executing the program stored in the flash EEPROM, without stopping the CPU. To the microcomputer in this embodiment, various modifications are applicable like the microcomputer in the first embodiment, needless to say.

A microcomputer according to the present invention has a feature of being operable even when the supply voltage is lower than the lower operating voltage limit of the nonvolatile memory and thus operating in the same manner as a microcomputer with a built-in ROM. Therefore, the microcomputer according to the present invention can be incorporated into various types of electronic devices.

While the invention has been described in detail, the foregoing description is in all aspects illustrative and not restrictive. It is understood that numerous other modifications and variations can be devised without departing from the scope of the invention.

What is claimed is:

1. A microcomputer with a built-in electrically rewritable nonvolatile memory, comprising:
   a CPU;
   the electrically rewritable nonvolatile memory for storing a program executable by the CPU;
   a plurality of volatile memories having a smaller capacity than that of the nonvolatile memory;
   a system bus for connecting the CPU, the nonvolatile memory, and the plurality of volatile memories;
   a program transfer bus provided separately from the system bus for connecting the nonvolatile memory and the plurality of volatile memories;
   a program transfer section for transferring a part of the program stored in the nonvolatile memory to the plurality of volatile memories using the program transfer bus;
   an address conversion section for converting an address in the nonvolatile memory which is output from the CPU into an address in each of the plurality of volatile memories; and
   a voltage detection section for detecting a supply voltage which is to be provided to the nonvolatile memory;
   wherein:
   the plurality of volatile memories include a plurality of memories usable as a transfer memory and an execution memory in a switched manner in accordance with an execution state of the program by the CPU; and
   in a state where the voltage detected by the voltage detection section is lower than a first voltage, the program transfer section transfers the part of the program stored in the nonvolatile memory to the transfer memory, and the address conversion section converts the address in the nonvolatile memory which is output from the CPU into an address in the execution memory.

2. A microcomputer according to claim 1, wherein the program transfer section accesses the nonvolatile memory when the CPU is not accessing the nonvolatile memory.

3. A microcomputer according to claim 1, further comprising a voltage boost section for boosting the supply voltage to be provided to the nonvolatile memory when the voltage detected by the voltage detection section is lower than the first voltage.

4. A microcomputer according to claim 3, wherein the voltage boost section boosts the supply voltage to be provided to the nonvolatile memory when the voltage detected by the voltage detection section is lower than the first voltage and further the program transfer section performs program transfer.

5. A microcomputer according to claim 1, wherein in the state where the voltage detected by the voltage detection section is between the first voltage and a second voltage which is higher than the first voltage, the program transfer section performs program transfer and the address conversion section does not perform address conversion.

6. A microcomputer according to claim 1, wherein the first voltage is equal to a lower operating voltage limit of the nonvolatile memory.

7. A microcomputer according to claim 1, wherein the first voltage is higher than a lower operating voltage limit of the nonvolatile memory.

8. A microcomputer according to claim 1, wherein among the plurality of volatile memories, a memory storing a part of the program which have been already executed by the CPU is used as the transfer memory, and a memory storing a part of the program to be executed by the CPU is used as the execution memory.

9. A microcomputer according to claim 8, wherein the transfer memory and the execution memory are switched to each other when the CPU completes execution of a predetermined range of the program.

10. A microcomputer according to claim 9, wherein in the state where the voltage detected by the voltage detection section is lower than the first voltage, the transfer memory and the execution memory are switched to each other when the CPU completes execution of the part of the program stored in the execution memory.

11. A microcomputer according to claim 9, wherein in the state where the voltage detected by the voltage detection section is between the first voltage and a second voltage which is higher than the first voltage, the program transfer section performs program transfer, the address conversion section does not perform address conversion, and the transfer memory and the execution memory are switched to each other when the CPU completes execution of a part of the program stored in the nonvolatile memory, the part being stored in the execution memory.

12. A microcomputer according to claim 1, wherein:
the nonvolatile memory stores a sub routine program as a part of the program executable by the CPU;
the plurality of volatile memories include a sub routine program memory which is used neither as the transfer memory nor as the execution memory; and
the program transfer section transfers the sub routine program stored in the nonvolatile memory to the sub routine program memory before the voltage detected by the voltage detection section becomes lower than the first voltage.

13. A microcomputer according to claim 1, wherein:
the nonvolatile memory stores an interrupt vector table as a part of the program executable by the CPU; among the plurality of volatile memories, the memories usable as the transfer memory and the execution memory each have an interrupt vector table area; and
the program transfer section transfers the interrupt vector table stored in the nonvolatile memory to the interrupt vector table area of each of the volatile memories usable as the transfer memory and the execution memory before the voltage detected by the voltage detection section becomes lower than the first voltage.

14. A microcomputer according to claim 1, further comprising an external interface section connected to the program transfer bus for communicating with a nonvolatile memory rewriting device externally provided to the microcomputer.

* * * * *